US005508055A

United States Patent [19]

Rubow et al.

[11] Patent Number: 5,508,055
[45] Date of Patent: Apr. 16, 1996

[54] POURABLE SALAD DRESSINGS

[75] Inventors: Richard E. Rubow, Ridgefield Park; Daniel J. Kochakji, West Milford, both of N.J.; Michele A. Buchanan, Montgomery, N.Y.; Charles R. Brown, Bedford, England; Stephen C. Daniels, Great Addington, England; Malcolm G. Jones, Stevington, England; Ian T. Norton, Rushden, England

[73] Assignee: Thomas J. Lipton Co., Division of Conopco, Inc., Englewood Cliffs, N.J.

[21] Appl. No.: 456,015

[22] Filed: May 31, 1995

Related U.S. Application Data

[63] Continuation of Ser. No. 328,180, Oct. 24, 1994, abandoned.

[51] Int. Cl.$^6$ .................... A23L 1/24; A23L 1/05
[52] U.S. Cl. .................. 426/573; 426/575; 426/589; 426/602; 426/613; 426/804
[58] Field of Search .................... 426/589, 602, 426/605, 607, 613, 804, 573, 575

[56] References Cited

U.S. PATENT DOCUMENTS

| | | | |
|---|---|---|---|
| 3,764,707 | 10/1973 | Habersberger | 424/361 |
| 4,129,663 | 12/1978 | Jamison et al. | 426/602 |
| 4,145,451 | 3/1979 | Oles | 426/589 |
| 4,305,970 | 12/1981 | Moran et al. | 426/603 |
| 4,352,832 | 10/1982 | Wood et al. | 426/589 |
| 4,446,165 | 5/1984 | Roberts | 426/602 |
| 4,576,645 | 3/1986 | Ravel et al. | 106/125 |
| 4,596,715 | 6/1986 | Ballard et al. | 426/589 |
| 4,734,287 | 3/1988 | Singer et al. | 426/41 |
| 4,855,156 | 8/1989 | Singer et al. | 426/41 |
| 4,869,916 | 9/1989 | Clark et al. | 426/573 |
| 4,911,946 | 3/1990 | Singer et al. | 426/656 |
| 4,963,370 | 10/1990 | Uchida et al. | 426/7 |
| 4,985,250 | 1/1991 | Bee et al. | 424/401 |
| 5,087,471 | 2/1992 | Combes et al. | 426/573 |
| 5,102,681 | 4/1992 | Singer et al. | 426/589 |
| 5,153,020 | 10/1992 | Singer et al. | 426/567 |
| 5,209,942 | 5/1993 | Bauer et al. | 426/573 |
| 5,338,561 | 8/1994 | Campbell et al. | 426/602 |

FOREIGN PATENT DOCUMENTS

| | | |
|---|---|---|
| 67887/90 | 4/1993 | Australia. |
| 0304130 | 2/1989 | European Pat. Off.. |
| 0323529 | 7/1989 | European Pat. Off.. |
| 0326198 | 8/1989 | European Pat. Off.. |
| 0355908 | 2/1990 | European Pat. Off.. |
| 0432835 | 6/1991 | European Pat. Off.. |
| WO89/12403 | 12/1989 | WIPO. |
| 89/12403 | 12/1989 | WIPO. |

OTHER PUBLICATIONS

Morris, E., "Mixed Polymer Gels", *Food Gels*, (1990), pp. 291–352.
Co–pending application Serial No. 07/627,148.
Co–pending application Serial No. 07/394,466.
The Journal of the American Oil Chemists' Society, vol. 36, Aug. 1959, pp. 345–348.

*Primary Examiner*—Jeanette Hunter
*Attorney, Agent, or Firm*—James J. Farrell

[57] ABSTRACT

A pourable acidic dressing containing selected non-starch polysaccharides in the form of sheared gel particles to suspend particulate materials in the dressing. The dressing contains up to small amounts of xanthan which are rheologically acceptable.

11 Claims, No Drawings

POURABLE SALAD DRESSINGS

This is a continuation application of Ser. No. 08/328,180, filed Oct. 24, 1994, now abandoned.

FIELD OF THE INVENTION

The present invention relates to pourable acidic salad dressings and especially pourable salad dressings of low viscosity which nevertheless possess good particle suspending properties. These dressings have substantially different rheological properties than dressings containing effective amounts of Xanthan gum.

BACKGROUND OF THE INVENTION

THE RELATED ART

Many attempts have been made to formulate good quality pourable salad dressings. In particular there is a need for pourable products with a good appearance and physical characteristics at all fat levels from 50 wt % down to zero fat products. High fat two-phase dressings (25 to 50 wt %) have aqueous phases which normally do not suspend herbs, vegetables and spice pieces. Current dressings commonly employ xanthan to keep pieces of herbs, vegetables and spices suspended, but use of xanthan at levels high enough to be effective results in a viscosity which is undesirably increased over full fat or home-made products. Use of xanthan also results in poor surface coating properties and in a slimy mouthfeel. At higher levels xanthan produces higher viscosities but also undesirable gel like pituitous properties such as those referred to in U.S. Pat. No. 4, 129,663. Therefore the drastic reduction, and preferably the complete removal of xanthan from pourable salad dressings is desired.

Heretofore, preparations of pourable salad dressings have usually allowed relatively high levels of xanthan and have not been completely satisfactory.

Accordingly it is an object of the invention to overcome one or more of the disadvantages of the prior art.

The present invention delivers pourable dressings which are free of an effective amount of xanthan. These dressings have improved rheology, stability, surface coating properties and mouthfeel when compared with fat free/low fat and xanthan containing dressings of the prior art as well as the traditional two-phase oil and vinegar dressings.

STATEMENT OF INVENTION

It has now been discovered that such dressings can be obtained if the dressing composition contains specific polysaccharide gels and the dressing is prepared under shear conditions which cause disruption of the normal polysaccharide network formation.

The invention thus focuses on a dressing containing gelled polysaccharides prepared under specific shear and temperature conditions, which dressing, in the absence of effective amounts of xanthan has the ability to keep herb, vegetable and/or spice pieces suspended. This suspension effect is attained at a lower viscosity than that when xanthan is employed and the surface coating behaviour when poured onto salad is also better.

According to a first aspect of the invention a process is provided for preparing a pourable dressing comprising 0–50 wt. % of fat, 46–99 wt. % of water and 0.1–4 wt. % of one or more non-starch polysaccharides present in a sheared gel form, and an acidulant. The polysaccharide, when used either singly or in combination are those which are capable of forming a gel in water under quiescent conditions. This quiescently formed gel in turn is capable of being formed at the concentration, pH, titratable acidity and salt content of the dressing. These gels can be:

(A) a thermoreversible gel; or
(B) a chemically set gel; or
(C) a synergistic gel.

The method comprises the steps of:

(A) dispersing the polysaccharides in water adding one or more other ingredients, including herbs, vegetables and spice pieces, to the dressing composition, these pieces vary from visible up to about ¼";
(B) applying high shear during the thermal formation of the gel; and
(C) adding the remaining ingredients of the dressing if there are any that have not already been added.

The final dressing is characterized by having a Brookfield viscosity of 100–4,500 cps. (centipoise), and a yield stress (tan delta=1) of 0.1–10 Pa.

The composition of the invention is a pourable acidic dressing comprising (i) 014 50 wt % of fat;
(ii) 46–99 wt % of water;
(iii) 0. 1–4 wt % of one or more non-starch polysaccharides being present in a sheared gel form;
(iv) an acidulant; and
(v) other ingredients characteristic of different varieties of dressings to achieve desirable organoleptic properties including herbs, vegetable and/or spice particulates as mentioned above; where the dressing has a Brookfield viscosity of 100-4,500 cps., and a yield stress (tan delta=1) of 0. 1–10 Pa.

The polysaccharides when used either singly or in combination, are those which are capable of forming a gel in water under quiescent conditions. This quiescently formed gel in turn is capable of being formed at the concentration, pH, titratable acidity and salt content of the dressing. Such gels can be:

(A) a thermoreversible gel; or
(B) a chemically set gel; or
(C) a synergistic gel;

DETAILS OF THE INVENTION

Dressings of the invention preferably have a Brookfield viscosity in the range of 100 to 4500 cps., more preferably 200 to 1000 cps.

Brookfield viscosity is determined by taking the viscosity after shearing for 1 minute at 10 rpm using a Brookfield DV-I+™ viscometer fitted with the RV spindle set at ambient temperature.

Dressings of the invention have a yield stress (tan delta=1) in the range 0.1 to 10 Pa., preferably 0.2–5 Pa, more preferably 0.2–2 Pa. These values are determined by performing an oscillatory stress ramp using a Carrimed CSL™ 500 rheometer using standard geometries, and determining the stress value at which the tangent of the delta function becomes unity (tan delta=1), said method enabling comparison of different materials at the same deformation state.

The determination of viscosity and yield stress is made at the temperature of normal product usage, being 5–35° C. but most typically 18–25° C.

In preparing the dressings of the invention, shear is applied during gel formation. Shear can be applied by various means e.g., by using a high shear mixer such as a scraped surface heat exchanger. However, there must be sufficient clearance to allow substantial passage of particulates up to about ¼'. This sufficient clearance is gained by using a scraped surface heat exchanger, with properly sized rotors, to allow for a ¼ inch minimum annular spacing for the product. Larger spacing may allow larger particulate integrity. Smaller spacing will not allow homogeneous distribution of particulates, and destroys particulate integrity. It has been found that the final quality of the product also depends on the shear clearance and conditions which are applied to the product. Generally a relatively high shear is used.

Suitable equipment is e.g., a scraped surface heat exchanger (e.g., a Contherm™ model 6×3) operated at a product temperature of 5° C., at a throughput of 1.5 to 4.0 kg/minute and having a tip speed of 1.5 to 10 m/s., preferably 2.0 m/s. In order to obtain a product with the desired rheology and surface coating properties, the skilled person, when using other shear devices, can determine appropriate shear conditions and clearances which are at least equivalent to the conditions of the Contherm™.

All particulates must be added in the pre-mix before shearing starts, preferably all of the dressing Ingredients are also added.

According to a preferred embodiment, the dressing pre-mix is pasteurized before shearing.

The gels which may be employed for the invention are selected from the group consisting of thermoreversible gels, chemically set gels and synergistic gels.

For the purpose of the invention the term thermoreversible gels refers to polysaccharide gels which melt upon heating and which re-take their gel structure upon cooling. Examples of thermoreversible gels of polysaccharides are disclosed in EP 355 908.

Non-starch polysaccharides preferred for this purpose are agar, iota-carrageenan, kappa-carrageenan and furcellaran. The preferred concentration is 0.5–2.0 wt. %, more preferably 0.7–1.5 wt. %, most preferably 0.9–1.1 wt. %, except for agar where the level is preferably 0.2–2.0 wt. %, more preferably 0.4–1.1 wt. %.

The gelation temperature of thermoreversible gels preferably is 0–85° C., more preferably 20–50° C.

For the purpose of the present invention, the term chemically set gels refers to polysaccharide gels which do not reversibly melt upon increasing the temperature. They derive their gel structure from a chemical interaction of the polysaccharide with appropriate ions, e.g., $Ca^{2+}$ ions. Examples of chemically set gels of polysaccharides are disclosed in Australian patent B-67887/90.

A suitable non-starch polysaccharide preferred for this purpose is sodium/calcium alginate, where the degree of alginate conversion to calcium alginate is preferably >10%, more preferably 20–100%, most preferably 70–90%. For the calcium dependency of the alginate gel strength, see Food Gels, pp. 53–78, (Ed. P. Harris), 1990, Elsevier ISBN 1-85166-441-9.

Another chemically set gel is low-methoxy (DE 5–50) pectin with an R value in the range 0.3–1.0 (where R is defined as twice the calcium concentration divided by the concentration of free pectinate groups). The desired R-value is attained by adding an appropriate amount of $CaCl_2 \cdot 2H_2O$-solution to the pectin solution.

These chemically set gels are preferably used at a level of 0.3–2.0 wt %, more preferably 0.6–1.5 wt %, most preferably 0.7–1.1 wt %.

Preferred cations for effecting the gelation are $Ca^{2+}$, and $K^+$, which are used in such amount that the above conversion degree or R value is attained. Normally, suitable concentrations are found in the range 0.01–1.0 wt. %.

Synergistic gels are described in, for example, Edwin R. Morris, Mixed Polymer Gels, Food Gels, Elsevier Applied Science (1990), 291–352. For the purpose of the invention, synergistic gels are understood to comprise all mixtures of two or more polymers, at least one of these being a non-starch polysaccharide, that may individually be non-gelling, but which will form gels (or gels of higher modulus) on mixing.

Examples of combinations of polysaccharides which are capable of forming synergistic gels are sodium alginate/pectin, propylene glycol alginate (PGA)/pectin, agar/locust bean gum and kappa-carrageenan/locust bean gum.

A gel selected from the group consisting of agar, calcium pectinate, calcium alginate, sodium alginate/pectin, kappa-carrageenan and iota-carrageenan is preferred for use in the dressings of the present invention.

More preferred is the synergistic alginate/pectin gel, with a weight % preferably being 0.2–0.9, more preferably 0.3–0.8, most preferably 0.4–0.7.

Especially preferred is the synergistic sodium alginate/ high-methoxy pectin gel. The sodium alginate preferably has high guluronic acid content. The hydroxyl groups of the high methoxy pectin have been methylated preferably at a level of more than 50%, more preferably greater than 55%, most preferably 60–80%.

The alginate:pectin ratios preferably are 30:70 to 90:10, more preferably 40:60 to 80:20, most preferably 50:50 to 70:30.

The combined weight percentage level of alginate and pectin is preferably 0.50–4.0 wt. %, more preferably 0.70–3.0 wt. %, most preferably 0.90–2.0 wt. %.

The dressing composition based on alginate/pectin is acidified according to the requirements of titratable acidity described below but limited by the need for a pH<4.0, more preferably<3.85, most preferably 3.2–3.8.

These synergistic gels are made, preferably in the substantial absence of $Ca^{2+}$ cations so that no chemically set gels are formed. Preferably, when synergistic gels are made, the level of $Ca^+$ is 0–0.01 wt. % and more preferably 0–0.001 wt. %. The most preferred compositions of the invention are substantially free from $Ca^{2+}$, by reducing the level of calcium ions the taste of the dressing is improved.

The water used for preparing the dressing preferably is free from calcium, e.g., by employing deionized or demineralized water.

The level of xanthan allowed in compositions of the invention must be low enough not to deleteriously affect the rheology of the product, thus being less than an effective amount, preferably less than 0.25 wt. %, but most preferably the compositions of the invention are substantially free from xanthan. It is well known to use small amounts of xanthan gum to minimize water separation and these small amounts may be used provided they do not have the deleterious effect on rheology mentioned above.

Dressings are food compositions with an acid taste. An acidulant is incorporated for imparting the desired taste and flavor and for microbiological preservation. Suitable acidifiers comprise acetic acid, lactic acid, fumaric acid, citric acid and phosphoric acid. Vinegar and acetic acid are preferred dressing acidulants. The optimum amount of acidulant is established by sensory evaluation and microbiological stability. It is known that a sensory appreciation does not have a good correspondence with the pH of the dressing, because ingredients such as proteins may interfere with the acidity perception. A better parameter for measuring acidity is the Titratable Acidity (TA). The titratable acidity is the amount (g) of titratable acid on the total amount (g) of dressing x 100%. The preferred titratable acidity expressed as acetic acid is 0.5–2.5%, more preferably 0.9–1.8% and most preferably 1.1–1.4%. A method of measuring titratable acidity is included below with the examples.

Compositions of the invention preferably comprise 0–50 wt % of fat, more preferably the level of fat is 0–15 wt. %, most preferred are fat levels of 0–10 wt. % including substantially fat-free dressings and dressings having a fat content of only 0 to 1.4 wt. %.

Throughout this specification the terms oil and fat are used interchangeably. Also indigestible fats such as sucrose polyesters and the like may be used.

Fats for use in the dressings of the invention preferably are liquid at room temperature. Preferably their SAFA content is $\leq 15$ w %. Traditional salad dressing oils or other suitable naturally occurring oils or mixtures thereof may be used, for example, olive oil, soybean oil, linseed oil (about 10 wt. % SAFA), canola oil (about 9 wt. % SAFA), safflower oil (about 9 wt. % SAFA), sesame oil (about 9 wt. % SAFA). Also oils obtained from (genetically) modified sources may be chosen. It is also possible to obtain low SAFA oils by fractionation and/or modification of naturally occurring oils. An example of a very low SAFA oil and its method of preparation is disclosed in EP 326 198.

The low/zero fat pourable dressing of the present invention possesses several advantageous properties. It is substantially free of xanthan and has good rheological and surface coating properties. The dressing contains visible pieces of herbs, vegetables and/or spices. Its consistency keeps the pieces suspended for at least four weeks. The slimy mouthfeel of xanthan based dressings is substantially reduced or even eliminated.

The invention also enables the preparation of a two-phase dressing at a low viscosity which allows an oil phase as a separate layer in addition to an aqueous phase containing suspended pieces. This is superior to traditional dressings and xanthan containing dressings with the same viscosity.

The compositions of the invention contain water at a level of 46–99 wt. %, preferably 60–95 wt. %.

If desired, compositions of the invention may contain in addition to the above mentioned preferred gels other gelling or thickening agents. Examples of such materials are non-gelling hydrolyzed starch, amylose, denatured whey protein, carboxymethylcellulose, denatured soy protein, locust bean gum, guar gum, gum arabic and microcrystalline cellulose. Preferably, the total level of these additional gelling and/or thickening ingredients is 0–10 wt. %, more preferably 0–5 wt. %, most preferably 0–0.5 wt. %. However, dressings with the best taste are substantially free from these ingredients.

According to a further embodiment, a sheared gel with the particulate composition of the inventive dressing may be combined with other aqueous phase compositions in order to adjust the finished product parameters within the claimed ranges.

Optional ingredients of the dressing of the invention include flavors, salts, preservatives, vitamins, minerals, and coloring materials, to be added in the usual amounts. Suitable concentrations are: salt (e.g., sodium chloride) 0–4 wt. %, preservatives (e.g., potassium sorbate and sodium benzoate) 0–4 wt. %, coloring material (e.g., beta-carotene) 0–1 wt. %.

The invention will be further illustrated by means of the following examples, wherein all parts and proportions are by weight unless otherwise indicated.

EXAMPLES

Titratable acidity (TA)

The titratable acidity is the amount (g) of titratable acid on the total amount (g) of dressing×100%. It is established as follows:

Disperse a sample of 5–10 g salad dressing containing e.g., acetic acid as acidulant in 100 ml of distilled water and stir. Titrate with 0.1N sodium hydroxide (bracket the meter for pH 8.1 using a two-point standardization technique and standardize with a pH 7.00 buffer) until pH 8.1 after 30 seconds of stabilization (A ml). Do the same for distilled water instead of salad dressing (B ml). The TA (%) =[(C x (A-B)×0.1 / exact sample weight)]×100%.

C×1000 =relative molecular mass of the acid divided by the number of the dissociated acid groups in the molecule (e.g., acetic acid C =0.060). Ref.: Vogel, Textbook for Quantitative Inorganic Analysis and A.O.A.C. 14th Edition, 22.059, as modified herein.

For the nature and the amount of the ingredients see Table 1.

EXAMPLES 1–6

A dispersion of the gelling agent in cold water is heated to 85°–90° C. Sodium chloride, potassium sorbate and sodium benzoate are added and subsequently the liquid flavor components, the herb/spice/vegetable particulates, and the vinegar are added. The mixture is processed by conducting it through a scraped surface heat exchanger while contemporaneously cooling to a final temperature below 10° C. and applying shear so that the gel when formed has a lower modulus than a corresponding gel when formed under quiescent or non-shear conditions, but the resulting gel has a yield stress. The yield stress of the gel system suspends the admixed particulates.

EXAMPLE 7

Example 7 is carried out as described above. Additionally the dressing is distributed in containers. The container receives first the processed aqueous part of the dressing and then, on top of the dressing, oil in the appropriate ratio.

COMPARISON EXAMPLES A, B AND C

Comparison Process

See Table 1 for ingredients.

Xanthan is dispersed in cold water. Then sodium chloride, potassium sorbate, sodium benzoate and sucrose are dissolved and finally the flavor blend including particulates such as herbs, vegetabls and/or spices and the vinegar is then added and the mixture is stirred until homogeneous.

When the dressing contains oil, the oil is added as described above for Example 7.

RESULTS

It is believed that all dressings of the invention have good particle suspending properties. The surface coating capability as well as the mouthfeel (particularly absence of sliminess) and pouring are believed to be satisfactory.

The dressings of the invention will not exhibit the undesirable gel-like, pituitous characteristics typical of xanthan-based dressings such as Examples A, B and C.

TABLE I

COMPOSITION

| INGREDIENTS | A[1] | B[1] | C[1] | 1 | 2 | 3 | 4 | 5 | 6 | 7 |
|---|---|---|---|---|---|---|---|---|---|---|
| Xanthan gum | 0.7 | 0.25 | 0.17 | — | — | — | — | — | — | — |
| Agar | — | — | — | — | 1.00 | 0.40 | — | — | 0.80 | 0.28 |
| HM pectin[2] | — | — | — | 0.80 | — | — | 0.80 | 0.40 | — | — |
| Na Alginate | — | — | — | 1.20 | — | — | 1.20 | 0.60 | — | — |
| Sucrose | 4.00 | 4.00 | 2.8 | 4.00 | 4.00 | 4.00 | 4.00 | 4.00 | 4.00 | 2.8 |
| Sodium Chloride | 2.02 | 2.02 | 2.5 | 2.02 | 2.02 | 2.02 | 2.02 | 2.02 | 2.02 | 2.5 |
| K. Sorbate | 0.10 | 0.10 | — | 0.10 | 0.10 | 0.10 | 0.10 | 0.10 | 0.10 | — |
| Na Benzoate | 0.10 | 0.10 | — | 0.10 | 0.10 | 0.10 | 0.10 | 0.10 | 0.10 | — |
| Flavor Blend[3] | 3.12 | 3.12 | 2.18 | 3.12 | 3.12 | 3.12 | 3.12 | 3.12 | 3.12 | 2.18 |
| Vinegar | 11.50 | 11.50 | 8.05 | 11.50 | 11.50 | 11.50 | 11.50 | 11.50 | 11.00 | 8.05 |
| Soybean Oil | — | — | 40 | — | — | — | — | — | 1.50 | 40 |
| Demin./Water | 78.46 | 78.91 | 44.30 | 77.16 | 78.16 | 78.76 | 77.16 | 78.16 | 77.36 | 44.19 |

[1]comparison examples with xanthan
[2]high methoxy pectin
[3]includes vegetable/spice pieces It should be understood that the specific forms of the invention herein illustrated and described are intended to be representative only. Changes, including but not limited to those suggested in this specification, may be made in the illustrated embodiments without departing from the clear teaching of the disclosure. Accordingly, reference should be made to the following appended claims in determining the full scope of the invention.

We claim:

1. A pourable acidic dressing comprising:
   (i) 0–50 wt. % of fat;
   (ii) 46–99 wt. % of water;
   (iii) 0.1–4 wt. % of at least one non-starch polysaccharide present in the form of sheared-gel particles;
   (iv) an acidulant;
   (v) other ingredients characteristic of different varieties of dressings to achieve desirable organoleptic properties including one or more of visible herb, vegetable, and spice particulates, said polysaccharides characterized by forming at the concentration used in the dressing composition, in water, under quiescent conditions, at the appropriate pH, titratable acidity and salt concentration a gel selected from the group consisting of:
   (A) a thermoreversible gel;
   (B) a chemically set gel; and
   (C) a synergistic gel;
   said dressing having a Brookfield viscosity of 100–4,500 cps. and a yield stress (tan delta=1) of 0.1–10 Pa.

2. A dressing according to claim 1, having a Brookfield viscosity of 200–2000 cps. and a yield stress (tan delta=1) of 0.2–5 Pa.

3. A dressing according to claim 1 having a titratable acidity of 0.5–2.5%.

4. A dressing according to claim 1, where the acidulant is selected from the group consisting of vinegar or acetic acid.

5. A dressing according to claim 1, wherein the polysaccharide is selected from the group consisting of agar, calcium pectinate, calcium alginate, kappa-carrageenan; iota-carrageenan and the synergistic combination of sodium alginate/high-methoxy pectin.

6. A dressing according to claim 1, wherein the gel is a synergistic gel comprised of sodium alginate and high-methoxy pectin.

7. A dressing according to claim 1, which is substantially free of $Ca^{2+}$.

8. A dressing according to claim 1, which is substantially free of xanthan.

9. A dressing according to claim 1, containing visible pieces of vegetables, herbs and/or spices, which remain suspended for at least four weeks, said pieces being visible and up to ¼" in size.

10. A process for preparing a pourable dressing comprising
    (i) 0–50 wt. % of fat;
    (ii) 46–99 wt. % of water;
    (iii) 0.1–4 wt. % of at least one non-starch polysaccharide in the form of sheared-gel particles;
    (iv) an acidulant;
    (v) other ingredients characteristic of different varieties of dressings to achieve desirable organoleptic properties including one or more of visible herb, vegetable, and spice particulates, said polysaccharides characterized by forming at the concentration used in the dressing composition, in water, under quiescent conditions, at the appropriate pH, titratable acidity and salt concentration a gel selected from the group consisting of:
    (A) a thermoreversible gel;
    (B) a chemically set gel; and
    (c) o synergistic gel;
    said method comprising the steps of
        (I) dispersing the polysaccharides in water and adding one or more other ingredients, including said visible herb, vegetable and spice pieces, to the dressing composition;
        (II) applying shear during the thermal formation of the gel; and
        (III) adding the remaining ingredients of the dressing;
    the final dressing being characterized by having a Brookfield viscosity of 100–4,500 cps. and a yield stress (tan delta=1) of 0.1–10 Pa.

11. A process according to claim 10 wherein the dressing premix before shearing is subjected to a pasteurization treatment.

* * * * *